United States Patent [19]
Hammer et al.

[11] Patent Number: 5,811,162
[45] Date of Patent: Sep. 22, 1998

[54] SHEET-LIKE OR TUBULAR FOOD CASING BASED ON CELLULOSE HYDRATE

[75] Inventors: Klaus-Dieter Hammer, Mainz; Theo Krams; Martina Koenig, both of Wiesbaden, all of Germany

[73] Assignee: Kalle Nalo GmbH, Wiesbaden, Germany

[21] Appl. No.: 690,946

[22] Filed: Aug. 1, 1996

[30] Foreign Application Priority Data

Aug. 5, 1995 [DE] Germany ............... 195 28 890.4

[51] Int. Cl.⁶ ................................... F16L 11/08
[52] U.S. Cl. ............. 428/34.8; 428/532; 138/118.1; 426/105; 426/129; 426/277; 206/802; 264/205; 264/207; 264/211.19
[58] Field of Search ............... 428/34.8, 532; 138/118.1; 426/105, 129, 277; 206/802; 264/205, 207, 211.19

[56] References Cited

U.S. PATENT DOCUMENTS

| | | | |
|---|---|---|---|
| 4,002,712 | 1/1977 | Hammer et al. | 264/194 |
| 4,097,963 | 7/1978 | Hammer et al. | 17/49 |
| 4,178,416 | 12/1979 | Smith | 280/17.4 |
| 4,871,791 | 10/1989 | Hammer et al. | 524/35 |
| 5,096,754 | 3/1992 | Hammer et al. | 428/34.8 |
| 5,501,886 | 3/1996 | Hammer et al. | 428/34.8 |

FOREIGN PATENT DOCUMENTS

| | | |
|---|---|---|
| 0 491 637 | 6/1992 | European Pat. Off. . |
| 0 635 212 | 1/1996 | European Pat. Off. . |
| 0 638 241 | 2/1996 | European Pat. Off. . |
| 40 02 083 | 8/1991 | Germany . |
| 814760 | 6/1959 | United Kingdom . |

*Primary Examiner*—Christopher Raimund
*Attorney, Agent, or Firm*—Foley & Lardner

[57] ABSTRACT

A food casing based on cellulose hydrate, which is preferably used as a sausage casing, in addition to cellulose hydrate, includes a copolymer having units of methyl vinyl ether and maleic acid and/or alkali metal maleate. It can additionally contain further polymers.

22 Claims, No Drawings

SHEET-LIKE OR TUBULAR FOOD CASING BASED ON CELLULOSE HYDRATE

BACKGROUND OF THE INVENTION

1. Field of the Invention

The invention relates to a food casing based on cellulose hydrate that may be sheet-like or tubular, its use as a synthetic sausage casing, and to processes for its production.

2. Description of Related Art

Food casings based on cellulose hydrate are usually produced by the viscose process. In this process, an alkaline solution of cellulose xanthate (viscose solution) is extruded through an annular or slotted die, coagulated as cellulose hydrate gel by acidic liquid, and regenerated to form cellulose hydrate. The properties of the film may be varied by the composition of the viscose and by incorporating additives. If these cellulose hydrate films are used unreinforced as artificial casings, they are generally used as so-called "narrow casing". With a fiber reinforcement, they are principally used in the production of naturally ripened and mold-ripened long-life sausage.

In the production of fiber-reinforced food casings, a tubular or web-like fibrous material is coated or impregnated with viscose solution on one or both surfaces and is then treated in an appropriate manner with coagulation and regeneration liquid. The frequently low wet strength of casings of this type can be increased by cross-linking the cellulose. For this purpose, for example, the cellulose hydrate shaped body in the gel state can be treated with a cyclic urea compound which contains at least two N-methylol groups.

Artificial casings have to be pliable and sufficiently extensible in order, even after relatively long storage times, to be able to be stuffed with emulsion to the desired caliber without problems.

It is known to improve these properties by secondary plasticizers, such as glycerol. Since these plasticizers are not chemically bound to the cellulose hydrate, but are only bound by intermolecular forces to the cellulose hydrate, they are leached out when the casing is soaked in water or when the sausage is scalded or boiled. This causes a particularly intense embrittling of the plasticizer-free dried cellulose casing after processing. This phenomenon is due to a crystallization proceeding in the cellulose material, hydrogen bonds forming between the individual cellulose molecules in the cellulose structure and thus to the molecules coming into closer proximity and being spatially fixed. Owing to this structural change, the casing becomes particularly impact-sensitive and frequently tears along its entire length at the initial cutting.

After relatively long storage periods, the cellulose hydrate casings treated with a secondary plasticizer are also frequently brittle and hard, since the plasticizer migrates out of the casing with time. This can be prevented, if, to produce the cellulose hydrate casings, a viscose solution is used which contains a cross-linking compound, for example an alkyltrimethylolurea or an alkylaminebis-dimethylenetriazinonetetramethylol (See DE-A 23 62 551). The cross-linkers simultaneously act as internal (also termed "primary" or "permanent") plasticizers. However, cross-linkers generally effect a compression of the cellulose hydrate structure. This compression leads to considerably poorer functional properties of the casing. Swelling capacity, tear-growth resistance and extensibility decrease. If the secondary plasticizer has been removed, even a cross-linker having fatty properties can no longer prevent embrittlement. Without secondary plasticizers, casings containing compressed cellulose hydrate cannot be handled at all.

It is possible to loosen the structure to a limited extent by changing the coagulation conditions or by increasing the proportion of secondary plasticizer. By soaking the sausage casings in water prior to stuffing them, the structural change is then, however, all the greater. In each case, these changes no longer effect the stuffed sausage casing.

In order to achieve permanent plasticization, an attempt was made to "build in" the secondary plasticizer chemically with substantial retention of the cellulose hydrate structure. For this purpose, the casing in the gel state was treated with the aqueous solution of an alkylene oxide which had at least been modified with a reactive N-methylolcarbamate end group of the formula -CH$_2$-O-CO-NH-CH$_2$-OH (see DE-A 26 37 510). Even by this means it was not possible to sufficiently prevent shrinkage and compression of the cellulose matrix.

The sheet-like or tubular casing based on cellulose hydrate in accordance with DE-A 40 02 083, equivalent to U.S. Pat. No. 5,096,754, is successful without secondary plasticizers. It essentially comprises a mixture of cellulose hydrate and alginic acid and/or alginate. Even at moisture content (=water content) of less than 10% by weight, these casings are not brittle, but are instead papery and wrinkled. In a further development, a copolymer containing units of N-vinylpyrrolidone and 2- dimethylaminoethyl methacrylate was further incorporated into this casing (see EP-A 0 638 241).

A casing is also known which essentially comprises cellulose hydrate, polyvinylpyrrolidone and/or the copolymer mentioned above and, if appropriate, also alginic acid or alginate (see EP-A 0 635 212). Although this casing is so pliable that it does not require a secondary plasticizer, it is not hydrophilic enough.

Cellulose hydrate casings must exhibit a permeation as low as possible. The permeation is decisive for the ripening process and mold growth in naturally ripened and mold-ripened long-life sausage. Uniform ripening of these types of sausage requires a very slow release of water from the sausage composition during the first days. When conventional fiber-reinforced cellulose casings are used, a very high and constant relative ambient humidity must therefore prevail, for which reason raw sausage is ripened in ripening chambers, in which the relative humidity is controlled within narrow limits.

An insufficient or fluctuating moisture content of the ambient air leads to so-called dry rinds on the outer periphery of the sausage, in particular when the casing material has an excessive permeation and the sausage composition thus dries off too rapidly on the outer surface in the first days of ripening. The dry rind prevents further exit of moisture from the interior of the sausage, so that it is still moist after the conventional ripening time. In addition, the sausage casing no longer adheres sufficiently firmly, so that undesirable intermediate space is formed between the sausage composition and the casing and folds form in the casing.

Furthermore, mechanical strength and toughness of the cellulose hydrate casings is of critical importance. Collagen fiber casings, which are outstanding with respect to their permeation, simultaneously exhibit completely inadequate mechanical strengths. There are the same problems with alginate-modified casings which are not fiber-reinforced, although the addition of alginate in fiber-reinforced casings has very advantageous effects.

In addition, sausage manufacturers expect cellulose hydrate casings to exhibit good constancy of caliber, i.e., that sausages produced from one and the same casing material all have the same caliber within narrow limits. In this regard, the non-fiber-reinforced casings, particularly, require improvement.

A further quality feature of cellulose hydrate casings is their moisture balance. On the one hand, the material is to have a high swelling value, i.e., absorb the largest amounts of water possible. On the other hand, delayed release of water is simultaneously desirable, in which case the capacity for water absorption and release is not equivalent to the permeation nor correlates with it. The permeation is a measure of the water permeability of the casing, while the moisture balance characterizes the water absorption and water binding capacity of the casing. A good moisture balance ensures a problem-free drying process, in which no embrittlement or overdrying of the casing occurs.

SUMMARY OF THE INVENTION

It is therefore an object of the invention to avoid the disadvantages described above of known cellulose hydrate casings. In particular, casings are desired that exhibit an improved, i.e., higher, hydrophilicity, in particular in the case of fiber-reinforced casings, and an improved moisture balance, i.e., a high water absorption capacity and a low water release, in comparison with conventional known cellulose hydrate casings. The casings, at the same time, are to exhibit good pliability and extensibility and good mechanical strength and toughness, in particular in the case of non-fiber-reinforced casings and are not to become brittle even after relatively long storage times. They are, in addition, to succeed without, or with only a little, secondary plasticizer (usually glycerol). Furthermore, good constancy of caliber is highly desirable.

In accordance with the present invention, these objects are achieved by providing a cellulose hydrate food casing, which comprises 0.1 to 60% by weight, based on the weight of the dry cellulose, of a copolymer having units of (i) methyl vinyl ether and (ii) one or more of maleic acid and alkali metal maleate.

In accordance with the invention, there is also provided a process for producing a food casing that comprises mixing the copolymer with a viscose to form a homogeneous solution, extruding the resulting homogeneous solution, and coagulating and regenerating the extruded solution with an acidic precipitant liquid.

In accordance with the invention, there are also provided foodstuff, such as sausage, encased with the above described casings.

Further objects, features and advantages of the present invention will become apparent from the detailed description of preferred embodiments that follows.

DETAILED DESCRIPTION OF THE PREFERRED EMBODIMENTS

The food casings according to the invention, include a copolymer having (i) methyl vinyl ether units and (ii) maleic acid and/or alkali metal maleate unit. That is, in the finished food casing, the maleic acid units can be present as alkali metal maleate units. The two forms are interconvertible. Their proportions are determined by the pH, and can be selected as desired. Any such copolymers or mixtures thereof are useful.

The molar ratio of the units of methyl vinyl ether to the units of maleic acid and alkali metal maleate is generally 20:80 to 80:20, preferably 40:60 to 60:40, particularly preferably about 50:50, in the copolymer. In the 50:50 copolymers, the methyl vinyl ether units and the maleic acid units or alkali metal maleate units usually have an alternating sequence.

The copolymers may have any desired molecular weight. The mean molecular weight $M_w$ of the copolymers is preferably greater than 40,000, particularly preferably even greater than 100,000. It may be up to 2,000,000 or even higher, as long as the copolymers remain sufficiently soluble in the viscose solution. The efficacy of the copolymers generally increases with their molecular weight.

Copolymers having units of methyl vinyl ether and maleic anhydride are available commercially, for example under the name Gantrez AN® (CAS No. 108-88-3). They have previously been used in medicaments, e.g., as coating for coated tablets, or else as adhesive for false teeth. In alkaline media (such as the viscose solution mentioned at the outset), the maleic anhydride groups are hydrolyzed and said copolymer having units of methyl vinyl ether ($CH_3$—O—$CH=CH_2$) and alkali metal maleate ($MO_2C$—$CH=CH$—$CO_2M$, M=alkali metal, in particular Na; particularly preferably disodium maleate) forms. Owing to the carboxylate groups, the copolymer, in contrast to the non-hydrolyzed starting material, is very highly soluble in water. It may also be homogeneously mixed in relatively large amounts with the viscose solution. However, for practical reasons, an aqueous alkaline solution in which the copolymer has previously been hydrolyzed is generally added to the viscose solution. The aqueous solution preferably has a pH of about 8 to 10.

In the hydrolyzed state, the copolymer requires a greater volume and can thus particularly effectively prevent crystallization of the cellulose hydrate molecules. The casings of the invention therefore have a particularly high swelling value and a particularly high pliability. Owing to the greater volume require- ment, a greater number of hydrophilic groups are accessible, moreover, so that the casing absorbs more water and only releases it again over a longer period, which leads to an improved moisture balance. Drying is slowed down and drying out is prevented.

The content of the copolymer having methyl vinyl ether units and maleic acid units or alkali metal maleate units can vary within relatively wide limits and also depends on the type of use of the food casing. It is preferably 0.5 to 20% by weight, particularly preferably 0.7 to 10% by weight, very particularly preferably 0.75 to 5% by weight (these and all the following percentages are based on the weight of the dry cellulose, unless stated otherwise). The copolymer is used in an amount effective to improve the swelling value, the moisture balance, and also the mechanical properties, such as toughness and pliability. As the content increases, drying behavior, toughness and strength of the material improve. Even from 0.5% by weight, tearing of the tubular casings on incision is reliably prevented. The casing may be removed without problems from sausage slices and from larger sausage pieces, without the sausage meat adhering thereto in an undesirable manner. An additional easy-peel inner coating is not necessary. From 5% by weight of the copolymer, a secondary plasticizer (conventionally glycerol) is no longer necessary. This also applies to fiber-reinforced casings. The fiber-reinforcement generally comprises hemp fibers or other natural fibers, but any type of fibers are useful.

The food casing of the invention can, moreover, contain further polymers. Any desired polymer can be used.

Further copolymers which are suitable are, in particular, N-vinyl-pyrrolidone copolymers having units of the formulae I and II or I and III

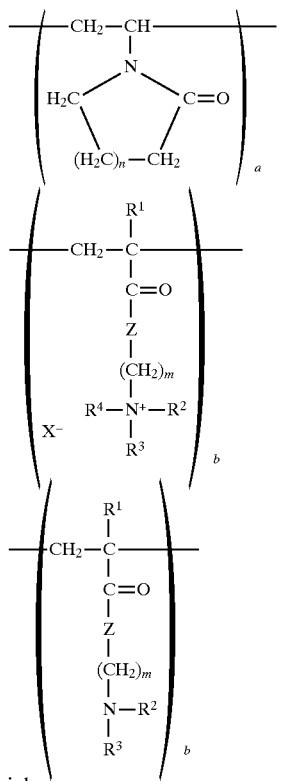

in which
n=1, 2 or 3,
m=2, 3, 4, 5 or 6,
a=20 to 80 mol %,
b=80 to 20 mol % and
a+b=100 mol %,
$R^1$=H or a ($C_1$–$C_6$)-alkyl radical,
$R^2$ to $R^4$ are identical or different ($C_1$–$C_6$)-alkyl radicals,
Z=O or N—$R^5$, in which $R^5$=H or ($C_1$–$C_6$)-alkyl radicals, and
X=$Cl^-$, $Br^-$, $I^-$, $F^-$, ½$SO_4^{2-}$, $HSO_4^-$, ($C_1$–$C_6$)—alkyl—O—$SO_2$—O—$^-$, or ($C_1$–$C_6$)-alkyl-$SO_2$—$O^-$.

Any such copolymers can be used. The R, Z, and X groups may vary in the repeating units. Preference is given to copolymers in which
n=1 or 3,
m=2, 3 or 4,
a=30 to 70 mol %,
b=70 to 30 mol % and
a+b=100 mol %,
Z=O or NH,
X=$HSO_4^-$($C_1$–$C_6$)-alkyl-O—$SO_2$—$O^-$, or ($C_1$–$C_6$)- alkyl-$SO_2$—$O^-$, and
$R^1$=H or $CH_3$,
$R^2$ to $R^4$ are identical or different and are $CH_3$ or $C_2H_5$.

The index n is preferably 1 or 3, i.e., the copolymer preferably contains units of N-vinylpyrrolidone and/or N-vinyl caprolactam.

Very particular preference is given to the addition of copolymers having units of N-vinylpyrrolidone and of ethyl-(2-methacryloyloxyethyl)dimethylammonium ethyl sulfate and quaternized copolymers having units of N-vinylpyrrolidone and of (3-methacryloylaminopropyl)-trimethylammonium chloride.

The copolymer having units of the formulae I and II or I and III generally has a mean molecular weight $M_W$, of 50,000 to 2,000,000, preferably 100,000 to 1,500,000, particularly preferably 500,000 to 1,500,000. The content of this copolymer is generally up to 30% by weight, preferably 1 to 15% by weight. The copolymer is used in an amount effective to ensure toughness and pliability. When an amount of 5 to 15% by weight is used, a secondary plasticizer is no longer required.

The casing of the invention can also further contain alginic acid and/or alginate. Alginic acids are known to be carboxyl-containing plant polymers (more precisely: polysaccharides). Alginates are the salts of the alginic acids, preferably the alkali metal, ammonium, and alkaline earth metal salts. Sodium alginate may be produced, for example, by brown algae being extracted with soda solution. Alginates or alginic acids comprise 1,4-beta-glycocidically linked D-mannuronic acid units having inserts of 1,4-alpha-glycosidically linked L-guluronic acid units. Similarly to cellulose, they are made up of long unbranched chain molecules. Owing to the large number of carboxyl groups, the alginates or alginic acids are extremely hydrophilic and are able to bind 200 to 300 times their weight of water.

Any desired amount of alginates or alginic acid can be used. The content of alginic acid/alginate is generally 1 to 12% by weight, preferably 5 to 10% by weight. The alginic acid or alginates are added in an amount effective to loosen the structure of the cellulose hydrate and thus to increase the swelling value. If the food casing contains alginic acid and/or alginate, the content of methyl vinyl ether/alkali metal maleate is preferably 0.5 to 20% by weight, particularly preferably 1 to 10% by weight based on the weight of the dry cellulose.

Furthermore, compounds such as calcium stearate may be added. Due to its fatty properties, the Ca stearate acts as a plasticizer. It also prevents the cellulose from recrystallization, condenses the surface of the casing, and reduces the permeation.

The swelling value of the casings generally varies between 125 and 140%, and thus roughly corresponds to the glycerol-containing standard casings. The permeation is generally 35 to 50 l of water per square meter and per day at a pressure of 40 bar. The food casings of the invention withstand an internal pressure at 5 to 10% above the nominal value before they burst. Their diameter increases only slightly with increasing internal pressure, i.e., the extension curve of the pure (=non-fiber-reinforced) cellulose tube displays a steeper course. This makes a more exact constancy of caliber possible than hitherto. In the case of non-fiber-reinforced cellophane casings, the so-called "relaxed bursting caliber", that is the caliber to which the casing returns after bursting (measured over the flat width) greatly increases. At a content of only 0.75% by weight of methyl vinyl ether/alkali metal maleate copolymer, the relaxed burst caliber is already increased by 10%.

The sum of the contents of the "further" polymers generally should not exceed 20% by weight. Adding the "further" polymers allows even glycerol-free food casings having very good functional properties to be produced, which contain less than 5% by weight, preferably 0.1 to 5% by weight of the methyl vinyl ether/alkali metal maleate copolymer.

The unreinforced food casing of the invention can, moreover, contain a secondary plasticizer such as glycerol. The glycerol content is used in an effective amount, generally in the range from 8 to 12% by weight, preferably from 10 to 11% by weight, based on the weight of the casing.

The reduction in the amounts of glycerol to be used in the production of the sausage casings is also extremely advantageous with regard to the emission problems in production and the migration problems in processing associated with glycerol. The casings, both glycerol-free and having reduced glycerol content, are very pliable and can be dried without problems, without disadvantageous embrittlement or overdrying occurring.

Furthermore, the cellulose hydrate casings of the invention are surprisingly improved with respect to their mechanical properties. This result is particularly astonishing according to the experience which has been gathered with alginic acid and/or alginate as a substitute for secondary plasticizers in non-fiber-reinforced casings. Alginic acid loosens the structure of the cellulose hydrate and thus counteracts the crystallization process described at the outset. This considerably improves the swelling value and the casing pliability. However, at the same time, the structural loosening by the alginate causes an impairment in the mechanical strength such that alginate-containing casings cannot be handled without fiber reinforcement. Surprisingly, incorporating the polymers described at the outset into the cellulose hydrate casing has an improving action on the swelling value and the moisture balance, the mechanical properties being also surprisingly simultaneously improved. This is shown, for example, in an improved bursting pressure, which are often 8 to 10% above the nominal value of the standard material, and the variations in caliber are considerably less.

The unreinforced food casings of the invention are particularly suitable as ring and narrow casings in the production of sausages. Owing to the excellent separability of the casing from the sausage meat emulsion, they are also usable as peelable casing, for example, in the production of frankfurters.

Fiber-reinforced and glycerol-free casings of the invention have similar properties to collagen casings and are therefore particularly suitable for naturally and mold-ripened sausage products, and also as large-diameter synthetic casings.

Adding the methyl vinyl ether/maleic acid/alkali metal maleate copolymer markedly increases the water absorption capacity of the food casing, measured as swelling value. Surprisingly, the incorporation of the polymer, apart from the effect on the swelling value, also decreases the permeation of the fiber-reinforced casings. However, this improvement does not adversely effect the mechanical strength of the material. This makes it possible to incorporate the copolymers even in relatively large amounts and thus to decrease permeation to a considerably greater extent than in solely alginate-modified casings. In addition, the fiber-reinforced cellulose hydrate casing of the invention features a delayed release of water. By this means, the casing remains pliable even after processing and after relatively long storage times of the sausages. It does not become sensitive to impact and does not tear so readily on being cut into as do conventional casings. Furthermore, the delayed release of water has a beneficial effect on the drying of the cellulose hydrate tube during its production. The drying is moderated and excessive drying is avoided.

In the production of sausages, the food casings of the invention are often used in the conventional caliber of 18 to 200, in particular 40 to 135, mm. The fiber-reinforced food casing, in the preferred caliber range of 40 to 135 mm, usually has a basis weight of 85 to 120 g/m$^2$. The unreinforced food casing is preferably used in the caliber range from 18 to 50 having a basis weight of 30 to 60 g/m$^2$. When secondary plasticizers such as glycerol are additionally present, the basis weight increases accordingly as a function of the amount of plasticizer.

The casings are often stored in sections or reels having a water content of 10% by weight. The water content of the concertinas is 14 to 20% by weight. The water content is increased to 23 to 30% by weight for concertinas not requiring soaking in water. These figures are based in each case on the total weight of the casing.

The food casings of the invention are preferably tubular and comprise a curved web, whose longitudinal edges are joined to form a seam. However, they can also be fabricated seamlessly by extrusion of the viscose solution through an annular die.

The present invention also relates to a process for the production of the food casings of the invention. Any desired process can be used. In a useful process, the copolymer containing units of methyl vinyl ether and alkali metal maleate is mixed with the alkaline viscose solution. The copolymer is preferably added in the form of an aqueous alkaline solution. The copolymers can also be added together with coloring pigments. The mixing can be performed in the spinning vessel or upstream of the spinning die. The solution is then extruded in a conventional manner through the spinning die, coagulated with an acidic precipitant liquid and regenerated. The viscose solution is still homogeneous even with a high proportion of copolymer. Precipitation and regeneration of the cellulose hydrate are not adversely effected.

The food casings of the invention are produced by the viscose process in a manner known per se. The copolymer containing units of methyl vinyl ether and alkali metal maleate and the further (co)polymers as set forth above, which are only present if appropriate, are homogeneously mixed with the alkaline viscose solution in the desired weight ratio, that is either in the spinning vessel or shortly upstream of the spinning die. The mixture of viscose and copolymer is extruded as a web or tube through a spinning die. When food casings having a fiber reinforcement are produced, a fiber web, which, if appropriate is curved to form a tube, is impregnated and coated in a manner known per se with the mixture of conventional alkaline viscose solution and copolymers. The viscose is then precipitated by the action of an acidic spinning liquid which conventionally contains sulfuric acid. The precipitant liquid is situated, for example, in a bath through which runs the extruded viscose solution, or the viscose-coated fiber web, if appropriate curved into a tube, or the precipitant liquid is applied as a film by a nozzle onto the extruded viscose or onto the viscous-coated fiber web. After passing through the regeneration and washing baths conventional in the production of food casings made of cellulose hydrate, the film is dried to the conventional moisture content, such as 8 to 10%.

If the food casings of the invention are to be used as sausage casings, they are, if appropriate, coated on the inside and/or outside. Any of the conventionally used coatings can be applied. The coatings serve to improve the adhesion between casing and sausage meat or, alternatively, also to improve peelability of the casing from its contents. The type of internal coating employed largely depends on the type of the respective stuffing. It is also customary to apply coatings to the outside of the casing, e.g., to protect the casing from being attacked by cellulase enzymes. The coating can also be a barrier layer with respect to atmospheric oxygen and water vapor. An inner coating can contribute to improving the peelability and/or to improving the adhesion between sausage meat mixture and casing inner wall. Owing to the described good separability from the sausage meat emulsion, the small-caliber cellulose casings of the invention can already be used as peelable casing without an easy-peel inner coating. This represents a considerable advantage. Finally, the casings can also have a fungicidal outer coating. If required, they contain conventional coloring pigments, e.g., carbon black or $TiO_2$. As tubular packaging casings, they are, for example in shirred form, brought into commerce as sections tied off at one end or, in laid-flat form, as reels.

The invention is described in more detail by the examples below. The examples are for illustrative purposes and do not limit the scope of the invention. Unless otherwise stated, all percentages are by weight. PBW represents parts by weight.

Example 1 (non-fiber-reinforced casing)

A 2.5% strength aqueous methyl vinyl ether/alkali metal maleate copolymer solution was prepared, by adding 1.5 PBW of methyl vinyl ether/maleic anhydride copolymer (Gantrez AN® 169BF, GAF Chemicals Corp., USA) to 54 PBW of water and 1.2 PBW NaOH.

The solution had a pH of 13.5.

In a continuous process, 2.6 l/h of this solution were uniformly mixed with 112 l/h of viscose solution (cellulose content 7.2%) and extruded through an annular die having a diameter of 40 mm (caliber 40) into a spinning bath of conventional composition. The gel tube formed in this then passed through the conventional precipitation, washing, and plasticizer baths. The gel tube was then inflated with air to the nominal caliber, dried to a residual moisture of 8 to 10% and then wound up. It was then moistened to a moisture content of 14 to 16% and shirred. The tubular casing produced in this way contained 0.75% by weight of methyl vinyl ether/alkali metal maleate copolymer, based on the weight of cellulose.

The bursting pressure of the casing produced in this manner was 35 kPa (required value: 30 kPa). The static extension at an internal pressure of 15 kPa was 44.5 mm (tolerated range: 42.5 to 46.5 mm). The swelling value was 135% (standard material: 140%).

On stuffing with sausage meat emulsion, a constant stuffing diameter of 44 mm was achieved. The casing displayed no faults, for example, by bursting. The subsequent scalding and smoking proceeded normally. The sausage could be cut into in the hot state as in the cold state, without the casing tearing or bursting during this. The casing could additionally be peeled off readily and without adhering residues of sausage meat emulsion.

Example 2 (non-fiber-reinforced casing)

A ring casing of caliber 45 was produced in a continuous process. For this purpose, the viscose solution (210 l/h) was mixed with 4.5 l/h of a solution prepared from 1.5 PBW of methyl vinyl ether/maleic anhydride copolymer (Gantrez AN® 169BF), 54 PBW of water, 1.2 PBW of NaOH 2.285 PBW of pigment preparation (Novofilbraun HFR®, Hoechst AG), 1.015 PBW of pigment preparation (Novofilgelb A-RR®, Hoechst AG) and 1.3 PBW of 56.5% strength aqueous lactic acid (pH: 9.0) and extruded in the manner described in Example 1. Washing, softening and drying in the ring shape were performed conventionally. The casing was then in turn wound up as described, moistened, and then shirred in sections to give so-called "concertinas".

No problems occurred during stuffing, scalding and smoking the sausage meat. The sausages could be stored for several months in a second packaging, without changing during the storage. On cutting into the cold or hot meat sausages, the casing did not tear. It could be removed readily and without adhering emulsion.

Example 3 (fiber-reinforced casing)

Hemp fiber paper (basis weight 17 $g/m^2$) was shaped into a tube (caliber 45 mm). The inside and outside of the tube were coated with a mixture of 112 l/h of alkaline viscose solution (cellulose content 7.2%) and 12.1 l/h of a 10% strength aqueous solution (pH 13.0; viscosity: 317 cP, measured in accordance with Höppler) of 18.43 PBW of 2% strength aqueous NaOH, 0.2 PBW of methyl vinyl ether/maleic anhydride copolymer (Gantrez AN® 169BF), 0.57 PBW of Na alginate (Protacell® 20 from Protan A/S, Norway) and 0.8 PBW of 50% strength aqueous Ca stearate solution (Lubranil CA®).

Of this mixture, 60% was applied to the outside and 40% to the inside of the fiber paper tube. The tube then passed through the conventional precipitation and washing vats (there was no separate softening in this case). The glycerol-free tube was then inflated to diameter and dried to a residual moisture content of 12 to 14%. The weight of the food casing thus produced was 76 $g/m^2$. The tube was then moistened and shirred in sections to give "concertinas", as described.

The tube was highly pliable, tough and strong. It contained 1.5% by weight of methyl vinyl ether/alkali metal maleate copolymer, 3.4% by weight of Na alginate and 3% by weight of Ca stearate, in each case based on the weight of the cellulose. The bursting pressure was 10% above the required value, the static extension was within the tolerance range. The swelling value was 150% (standard: 130 to 140%). The permeation was 48 $l/m^2 d$ at 40 bar internal pressure.

The concertinas were stuffed with long-life sausage meat emulsion on an automatic stuffing machine. Faults did not occur during this. The course of ripening and mold growth were favorable, similar to collagen casings. The peelability of the finished sausages was good. No dry rind formation was observed, even under unfavorable ripening conditions. This means that the low permeation compensated for unfavorable conditions in the ripening chamber.

Applicants hereby incorporate by reference in its entirety German Application 195 28 890.4 filed on Aug. 5, 1995, which is the priority document of the present application.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A cellulose hydrate food casing, which comprises 0.1 to 60% by weight, based on the weight of dry cellulose, of a copolymer that consists essentially of units of (i) methyl vinyl ether and (ii) one or more of maleic acid and alkali metal maleates.

2. A food casing as claimed in claim 1, wherein the molar ratio of units of methyl vinyl ether to the total units of maleic acid and alkali metal maleate in the copolymer is 20:80 to 80:20.

3. A food casing as claimed in claim 1, wherein the mean molecular weight $M_W$ of the copolymer is greater than 40,000.

4. A food casing as claimed in claim 1, wherein the proportion of the copolymer is 0.5 to 20% by weight, based on the weight of the dry cellulose.

5. A food casing as claimed in one claim 1, which additionally contains at least one further polymer.

6. A food casing as claimed in claim 5, wherein the further polymer comprises a N-vinylpyrrolidone copolymer having units of the formulae I and II or I and III

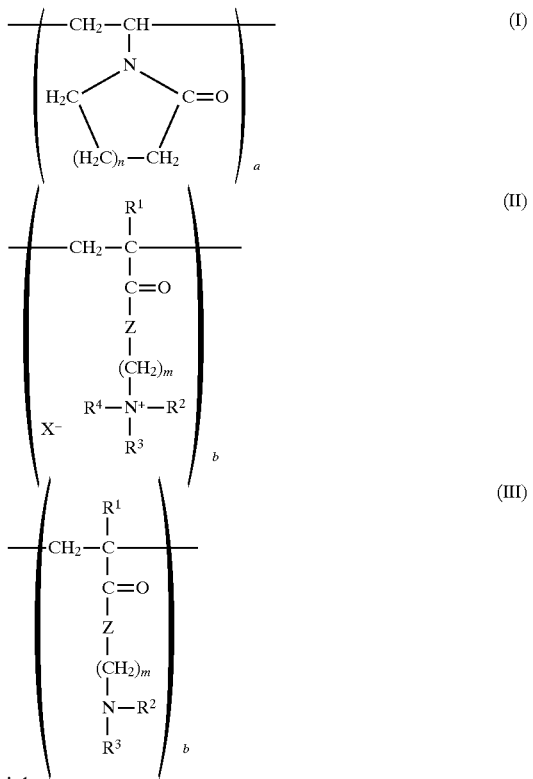

in which
n=1, 2 or 3,
m=2, 3, 4, 5 or 6,
a=20 to 80 mol %,
b=80 to 20 mol % and
a+b=100 mol %,
$R^1$=H or a ($C_1$–$C_6$)-alkyl radical,
$R^2$ to $R^4$ are identical or different ($C_1$–$C_6$)-alkyl radicals,
Z=O or N—$R^5$, in which $R^5$=H or ($C_1$–$C_6$)-alkyl radicals, and
X=Cl$^-$, Br$^-$, I$^-$, F$^-$, ½SO$_4^{2-}$, HSO$_4^-$, ($C_1$–$C_6$)—alkyl—O—SO$_2$—O—$^-$, or ($C_1$–$C_6$)-alkyl-SO$_2$—O$^-$.

7. A food casing as claimed in claim 6, wherein
n=1 or 3,
m=2, 3 or 4,
a=30 to 70 mol %,
b=70 to 30 mol % and
a+b=100 mol %,
Z=O or NH,
X=HSO$_4^-$($C_1$–$C_6$)-alkyl-O—SO$_2$—O$^-$, or ($C_1$–$C_6$)- alkyl-SO$_2$—O$^-$,
$R^1$=H or CH$_3$, and
$R^2$ to $R^4$ are identical or different and are CH$_3$ or C$_2$H$_5$.

8. A food casing as claimed in claim 6, wherein the copolymer having units of the formulae I and II or I and III has a mean molecular weight $M_W$, of 50,000 to 2,000,000.

9. A food casing as claimed in claims 6, wherein the proportion of copolymers having units of the formulae I and II or I and III is up to 30% by weight, based on the weight of dry cellulose.

10. A food casing as claimed in claim 1, which contains one or more of alginic acid and alginate.

11. A food casing as claimed in claim 10, wherein the total proportion of alginic acid and alginate is 1 to 12% by weight, based on the weight of the dry cellulose.

12. A food casing as claimed in claim 1, which is reinforced with a paper made of natural fibers.

13. A food casing as claimed in claim 12, which is glycerol-free.

14. A food casing as claimed in claim 1, that is peelable from foodstuff.

15. Unsmoked or smoked scalded-emulsion sausage or naturally or mold-ripened long-life sausage encased with a casing as claimed in claim 1.

16. A food casing as claimed in claim 1, which has a swelling value between 125 and 140%, and a permeation of 35 to 50 liter of water per square meter and per day at a pressure of 40 bar.

17. A food casing as claimed in claim 1, which is unreinforced.

18. A food casing as claimed in claim 17, which contains glycerol as a secondary plasticizer.

19. A food casing as claimed in claim 1, which is fiber-reinforced.

20. A food casing as claimed in claim 1, wherein the copolymer includes the alkali metal maleate unit.

21. A food casing as claimed in claim 1, wherein the copolymer consists of the units (i) and (ii).

22. A process for producing a food casing as claimed in claim 1, which comprises mixing the copolymer with a viscose to form a homogeneous solution, extruding the resulting homogeneous solution, and coagulating and regenerating the extruded solution with an acidic precipitant liquid.

* * * * *

UNITED STATES PATENT AND TRADEMARK OFFICE
CERTIFICATE OF CORRECTION

PATENT NO. : 5,811,162
DATED : September 22, 1998
INVENTOR(S) : Klaus-Dieter HAMMER, et al.

It is certified that error appears in the above-identified patent and that said Letters Patent is hereby corrected as shown below:

Column 12, Claim 6, lines 1 and 2, contains a typographical error wherein "$X=Cl^-, Br^-, I^-, F^-, \frac{1}{2}SO_4^{2-}, HSO_4-, (C_1-C_6)-alkyl-O-SO_2-O^-$, or $(C_1-C_6)-alkyl-SO_2-O^-$." should read --$X=Cl^-, Br^-, I^-, F^-, \frac{1}{2}SO_4^{2-}, HSO_4^-, (C_1-C_6)-alkyl-O-SO_2-O^-$, or $(C_1-C_6)-alkyl-SO_2-O^-$--.

Claim 7, lines 10 and 11, wherein "$X=HSO_4^- (C_1-C_6)-alkyl-O-SO_2-O^-$, or $(C_1-C_6)-alkyl-SO_2-O^-$." should read --$X=HSO_4^-, (C_1-C_6)-alkyl-O-SO_2-O^-$, or $(C_1-C_6)-alkyl-SO_2-O^-$--.

UNITED STATES PATENT AND TRADEMARK OFFICE
CERTIFICATE OF CORRECTION

PATENT NO. : 5,811,162
DATED : September 22, 1998
INVENTOR(S) : Klaus-Dieter Hammer, et al.

It is certified that error appears in the above-identified patent and that said Letters Patent is hereby corrected as shown below:

Column 5, line 61 and 62, delete "$X=HSO_4^-$ $(C_1-C_6)$-alkyl-$O-SO_2-O^-$, or $(C_1-C_6)$-alkyl-$SO_2-O^-$, and" and insert -- $X=HSO_4^-$, $(C_1-C_6)$-alkyl-$O-SO_2-O^-$, or $(C_1-C_6)$-alkyl-$SO_2-O^-$, and--.

Signed and Sealed this

Twenty-ninth Day of June, 1999

Attest:

Q. TODD DICKINSON

Attesting Officer       Acting Commissioner of Patents and Trademarks